Jan. 12, 1965　　　M. F. GORDON　　　3,165,712
ROTARY DISTRIBUTOR HAVING WAVEGUIDE COUPLING
ACROSS ROTOR-STATOR GAP
Filed Dec. 20, 1960

MILLARD F. GORDON
INVENTOR.

BY NILSSON & ROBBINS
BILLY A. ROBBINS

ATTORNEYS

United States Patent Office 3,165,712
Patented Jan. 12, 1965

3,165,712
ROTARY DISTRIBUTOR HAVING WAVEGUIDE COUPLING ACROSS ROTOR-STATOR GAP
Millard F. Gordon, Northridge, Calif., assignor to Thompson Ramo Wooldridge Inc., Canoga Park, Calif., a corporation of Ohio
Filed Dec. 20, 1960, Ser. No. 77,106
2 Claims. (Cl. 333—7)

This invention relates to electromagnetic energy wave transmission apparatus and more particularly to a switch for applying signals of electromagnetic energy to various circuits.

Although various prior art switches have been developed for applying electromagnetic energy wave signals to various circuits, they have for the most part been relatively large in size. The large size has limited the switching speed which may be utilized in any particular application.

Furthermore, the prior art switches have also included contacts which directly meet or rub against each other to accomplish the switching. This rubbing has produced wear and the friction also contributes to the slow switching speed.

Accordingly, it is an object of the present invention to provide an electromagnetic energy wave switch which is small in size, light weight, and may be used where exceedingly fast switching times are desired.

It is another object of the present invention to provide an electromagnetic energy wave switch which is simple and rugged and which is not subject to contact wear through use.

Other objects and advantages of the present invention may be determined from a consideration of the following description taken in conjunction with the accompanying drawing which is presented by way of example only and is not intended as a limitation upon the scope of the present invention and in which.

In accordance with one aspect of the electromagnetic energy wave switch of the present invention, there is provided a plurality of members of high dielectric constant material each of which has at least one open end. One of said members is disposed adjacent the remainder thereof in such a manner that the respective open ends are spaced apart a predetermined amount. Means is provided for producing relative movement between said one and said remainder of said plurality of members while maintaining said spaced apart relationship and means is electrically connected to said members for launching within and removing therefrom electromagnetic energy wave signals.

As is well known in the prior art, an electromagnetic energy wave which is launched within a wave guide, including high dielectric constant material having metallic coatings on opposed surfaces thereof, is not wholly contained within the wave guide. A strong electric field is established at the uncoated surfaces of the wave guide as a result of the reflective character of the high dielectric constant material and the atmosphere within which the wave guide operates. However, a magnetic field is set up about the wave guide and extends from the uncoated surface or surfaces thereof. This phenomena provides a means of accomplishing switching in accordance with the present invention. By placing an uncoated end surface of a first section of wave guide, similar in construction to that above described, adjacent a second section of wave guide having an electromagnetic energy wave signal propagated along it, a signal is generated within the first section by the magnetic field extending from the uncoated surface of the second section of wave guide.

Figure 1:
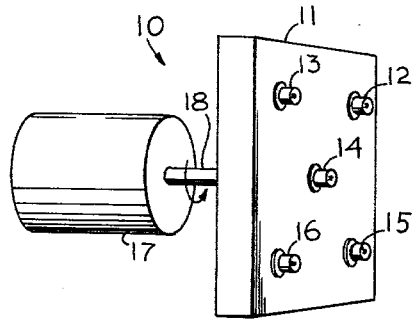
FIG. 1 is a perspective side elevational view of an electromagnetic energy wave switch in accordance with the present invention.

Referring now to the drawing and more particularly to FIG. 1 thereof, there is illustrated one form which an electromagnetic energy wave switch in accordance with the present invention may take. As is therein shown, the switch 10 includes a housing 11 within which there is supported a plurality of sections of high dielectric constant material having metallic coatings on opposed surfaces thereof as above described. These sections of dielectric constant material are supported in manners well known to the prior art. Affixed to one surface of the housing are a plurality of connectors 12 through 16. Each of the connectors 12 through 16 are of a standard type which are adapted to receive a coaxial cable for the transmission of electromagnetic wave energy into the apparatus within housing 11 which will be described more fully below. A power source 17 is interconnected by way of a shaft 18 to one of the sections of high dielectric material within the housing 11. The power source provides a means by way of the shaft 18 for producing relative movement between various of the sections of high dielectric constant material within the housing 11 in order to accomplish the switching of an electromagnetic energy wave signal in accordance with the present invention.

Figure 2:
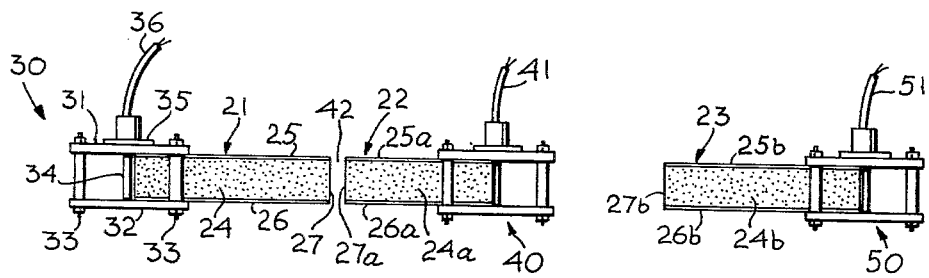
FIG. 2 is an enlarged side elevational view of a portion of the structure of FIG. 1.

The high dielectric constant material which is housed within the housing 11, as above described, may take a form such as that illustrated in FIG. 2. As is therein shown, there are provided three sections 21, 22 and 23 of wave guide each of which includes a high dielectric constant material 24 having metallic coatings 25 and 26 on opposed surfaces thereof. As can be be seen from FIG. 2 the end surface 27 of the wave guide section 21 is open. Each of the wave guide sections 22 and 23 is constructed in a similar manner to that of wave guide section 21 as is indicated by the utilization of the same numerals for various parts thereof, each of which has a letter subscript following it. Affixed to one end of the wave guide setcion 21 is means for either launching an electromagnetic energy wave signal within the wave guide section 21 or for removing such a signal therefrom. This means may be any transition device known to the art and for purposes of example only in FIG. 2, a broad band transition device is illustrated at 30. Such a transition device includes a pair of metallic plates 31 and 32 which are in electrical contact with metallic coatings 25 and 26, respectively. The metallic plates 31 and 32 are retained in place upon the metallic coatings by way of insulating bolts 33 which may be constructed, for example, of Teflon. A pin 34 is insulated from metallic plate 31 and is electrically connected to metallic plate 32, such as by soldering or the like. The metallic pin 34 extends across the end surface of the wave guide section 21 which is open similar to end surface 27 thereof. A connector 35 is electrically connected to plate 31 and is adapted to receive a coaxial cable 36 for applying an electromagnetic energy wave signal to the pin 34.

An electromagnetic energy wave signal which is applied to the pin 34 establishes an electrical field, adjacent the open end surface of the wave guide 21. The field which is established causes the electromagnetic energy wave signal to be generated within the wave guide section 21 and propagated along it. Conversely, if an electromagnetic energy wave signal is present within the wave guide section 21 it may be removed therefrom by utilization of the broad band transition device as illustrated in FIG. 2 and above described. The wave guide sections 22 and 23 each include a broad band transition device as above described and as indicated at 40 and 50.

Each of the wave guide sections 21 through 23, as illustrated in FIG. 2, may be mounted within a housing such as that illustrated at 11 in FIG. 1. The broad band transition devices 30, 40 and 50 may be respectively interconnected, for example, by way of coaxial cables 36, 41 and 51, respectively, to connectors 12, 14 and 16 respectively. The shaft 18, as illustrated in FIG. 1, may be interconnected with the wave guide section 22 in order to provide rotary motion thereto. If such were the case, a conventional rotary wave guide joint may be utilized between the connector 14 and the coaxial cable 41.

In operation, a signal may be applied by way of coaxial cable 41 and broad band transition device 40 to wave guide section 22. Coaxial cables may be connected to connectors 12 and 16 and to apparatus containing circuits to which there is to be applied the signal generated within wave guide sections 21 and 23 as described below.

Power may be applied by way of the power source 17 and the shaft 18 to the wave guide section 22 thereby imparting rotary motion to it. As wave guide section 22, having a signal propagated therealong, is rotated, the open end 27a thereof passes by the open end 27 of the wave guide section 21. As this occurs, the magnetic field which extends beyond the uncoated surface of the wave guide section 22 generates a signal similar to the signal, present within wave guide section 22, within the wave guide section 21. The signal is so generated within the wave guide section 21 by means of the magnetic radiation which extends beyond the wave guide section 22 and into the wave guide section 21 across the gap 42 which appears between each of the sections 21 and 22. The gap 42 may be of any predetermined size which is desirable under the particular design considerations so long as it is not sufficiently large to cause such an insertion loss as to diminish the signal below a usable level.

The signal thus generated within the wave guide section 21 is removed by way of the transition device 30 and the coaxial cable 36 to the coaxial cable connected to connector 12 and to the desired circuit. As the wave guide section 22 is rotated, it next passes wave guide section 23 thereby generating a signal within it in a manner similar to that above discussed in connection with wave guide section 21.

Although in FIG. 2 there are illustrated only three wave guide sections, it should be expressly understood that any number of wave guide sections desirable may be utilized depending upon the particular application in which the switch is to be utilized. A structure utilizing eight stationary wave guide members and one movable wave guide member is illustrated in FIG. 3 to which reference is hereby made.

As is illustrated therein a series of wave guide sections 61 through 68 of the type above described, are radially arranged so that their longitudinal axes all intersect at a common point. Although a wave guide of the type above described is preferable, any high dielectric constant material type wave guide may be used so long as at least one end thereof is open. Pivotally mounted at this common point is another section 69 of wave guide. A transition device 70 is affixed to one end of the wave guide 69 for applying a signal thereto. Connected to each of the wave guide sections 61 through 68 is an output transition device 71 through 78 respectively. Any transition device may be used and as illustrated in FIG. 3 the particular transition devices include a pin electrically connected to the wave guide at a point approximately one-quarter wavelength of the mean frequency of the frequency band to be encountered from the end thereof. In such a case the end of the wave guide nearest the transition device is shorted by extending the metallic coating across it.

In operation, a signal of electromagnetic wave energy is applied to the transition device 70 which is connected to wave guide section 69 and is thereby launched along it. Each of the output transition devices connected to wave guide section 61 through 68 is connected to the particular circuit which is desired. The wave guide section 69 is rotated, for example, past waveguide section 63 and the signal which is generated within the wave guide section 69 is then coupled across the space 81 between the wave guide section 69 and the wave guide section 63 and is propagated along the wave guide section 63. The signal thus generated within wave guide sections 63 is removed therefrom and applied to the desired circuit by way of transition device 73 and an appropriate conductor affixed thereto. If it becomes desirable to apply the signal to any other circuit which is connected to one of the stationary wave guide sections, the rotatable wave guide section 69 is moved from the position as illustrated in FIG. 3 so that it is aligned with any of the other wave guide sections thereby applying the signal to the desired circuit. If such is desirable, the rotatable wave guide section 69 may be connected to a motor or other similar type power source as illustrated in FIG. 1 which will cause it to continuously rotate about the common point thereby momentarily applying the signal generated therein to each of the circuits connected to the wave guide sections 61 through 68 in succession.

Figure 3:
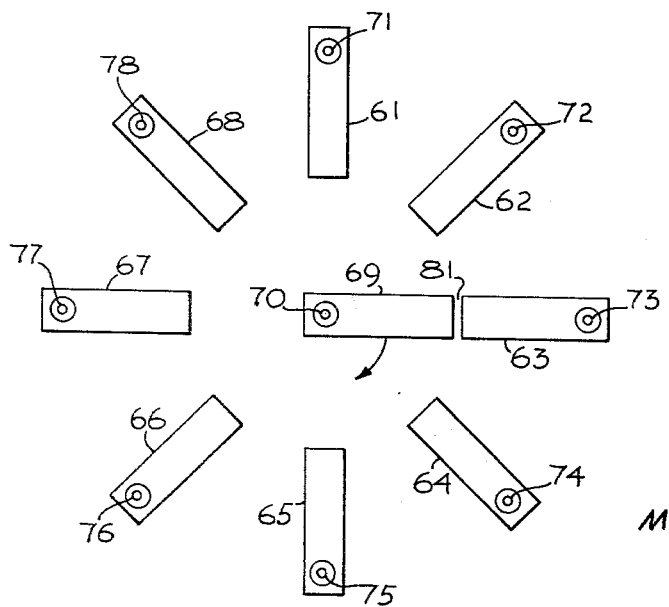
FIG. 3 is a plan view of an alternative embodiment of an electromagnetic energy wave switch in accordance with the present invention.

As will be noted by reference to FIG. 3, the rotatable wave guide section 69 does not contact any of the stationary wave guide sections 61 through 68 as it is being rotated. A relatively small space, indicated by numeral 81, depending upon the amount of loss which can be tolerated in any given application, is at all times maintained between the end surface of the wave guide section 69 and each of the other wave guide sections. For example, when using wave guide sections of high dielectric material such as titanium dioxide having silver coatings on opposite faces thereof and being approximately .150 x .150 inch in cross-section, a spacing on the order of about .1 to .01 inch has been found to be satisfactory.

Since the wave guide sections which are used for the switch in accordance with the present invention are very small and light in weight, and thus have a small mass, the rotatable section 69 may be rotated at exceedingly high rates of speed and the switch may thus be used for many applications where a given signal must be rapidly applied to a series of circuits in succession. Alternatively, a series of separate signals may be applied to each of the wave guide sections 61 through 68 and by rotating the rotatable section 69 each of the signals may be sampled momentarily and applied to any given system or circuit adapted for such use. Many other uses and applications for the switch will become readily apparent to those skilled in the art.

While, in the foregoing description of an electromagnetic energy wave switch in accordance with the present invention, a rotatable center member and stationary outer members have been described, it should be expressly understood that the outer members may be rotated about a stationary center member, the only criterion being relative motion between the center and outer sections either continuously or in separate discrete steps.

There has thus been disclosed an electromagnetic energy wave switch which is simple, small, rugged and does not utilize direct contact to transfer a signal.

What is claimed is:

1. An electromagnetic energy wave switch comprising: a rotatable member of high dielectric material having electrically conductive coatings on at least two opposed surfaces thereof and having at least one open end, a plurality of members of high dielectric material each having electrically conductive coatings on at least two opposed surfaces thereof and at least one open end, said plurality of members being circularly disposed about said rotatable member, means for rotating said open end of said rotatable member past said open end of each of said plurality of members, said open end of each of said plurality of members being spaced from said open end of said rotatable member during the time said rotatable member is rotating past each of said plurality of members, and means electrically connected to said rotatable member and to each of said plurality of members and adapted to launch signals within and remove signals from said members.

2. An electromagnetic energy wave switch comprising: a plurality of members of high dielectric material each having at least one open end, said plurality of members being equally spaced and disposed so that the longitudinal axes thereof intersect at a common point and said open ends are facing said point and spaced equidistant therefrom, an additional member of high dielectric material having at least one open end, means for mounting said additional member to rotate about said point to thereby move said open end thereof past said open end of each of said plurality of members but in spaced relation therefrom, and means electrically connected to each of said members and adapted to launch signals within and remove signals from each of said members.

References Cited in the file of this patent

UNITED STATES PATENTS

| | | |
|---|---|---|
| 2,597,607 | Alford | May 20, 1952 |
| 2,761,137 | Van Atta | Aug. 28, 1956 |
| 2,832,933 | Greenslit et al. | Apr. 29, 1958 |

FOREIGN PATENTS

| | | |
|---|---|---|
| 655,803 | Great Britain | Aug. 1, 1951 |